United States Patent [19]

Miyanaga

[11] Patent Number: 5,316,418
[45] Date of Patent: May 31, 1994

[54] HOLE CUTTER

[75] Inventor: Masaaki Miyanaga, Hyogo, Japan

[73] Assignee: Kabushiki Kaisha Miyanaga, Hyogo, Japan

[21] Appl. No.: 749,809

[22] Filed: Sep. 21, 1992

[51] Int. Cl.⁵ .............................................. B23B 51/04
[52] U.S. Cl. .................... 408/201; 408/206; 408/209
[58] Field of Search ............... 408/201, 204, 206, 209, 408/68

[56] References Cited

U.S. PATENT DOCUMENTS

| | | | |
|---|---|---|---|
| 4,385,853 | 5/1983 | Strange et al. | 408/68 |
| 4,408,935 | 10/1983 | Miyanaga | 408/206 |
| 4,555,203 | 11/1985 | Takahashi | 408/119 |
| 5,062,748 | 11/1991 | Kishida | 408/206 |
| 5,171,111 | 12/1992 | Kishimoto | 408/67 |

FOREIGN PATENT DOCUMENTS

| | | |
|---|---|---|
| 3807225A1 | 9/1989 | Fed. Rep. of Germany . |
| 3842401A1 | 6/1990 | Fed. Rep. of Germany . |
| 0201114 | 12/1982 | Japan .................. 408/209 |

OTHER PUBLICATIONS

Patent Abstracts of Japan—vol. 16, No. 346 (M-1286) Jul. 27, 1992 & JP-A-41 05 811 (Miyanaga: KK)—Abstract.

Primary Examiner—Mark Rosenbaum
Assistant Examiner—John M. Husar
Attorney, Agent, or Firm—Marshall, O'Toole, Gerstein, Murray & Borun

[57] ABSTRACT

This disclosure relates to a hole cutter comprising a spindle having a rearward end shaped to be engaged and rotated by a drive machine, the spindle further having a front end and an axial center bore. A cylindrical blade is attached to the front end of the spindle. A centering pin is supported in telescopic relation within the center bore of the spindle, the pin engaging with the spindle to limit the forward movement of the pin relative to the spindle. A spring is supported in the center bore and urges the pin forwardly relative to the spindle to normally project a portion of the pin forwardly from the spindle and the blade. A center drill is attached to the front end of the spindle and projects forwardly from the blade, the drill having an axial center bore which receives the projected portion of the pin. The drill further has a bit attached to its front end.

2 Claims, 3 Drawing Sheets

HOLE CUTTER

FIELD AND BACKGROUND OF THE INVENTION

The present invention relates to a hole cutter or core drill for cutting a relatively large hole in a relatively thick plate of metal such as steel.

The applicant's U.S. Pat. No. 4,408,935 dated Oct. 11, 1983 shows a metal borer of this general type including a shank 4, a cylindrical blade 1 and a centering pin 8, which is supported by the shank and urged by a spring to normally project forwardly from the blade. When in use, first, a thick metal plate has a small center recess formed by a separate drill, and the pointed end of pin 8 is located in the recess. Then, the shank 4 is rotated and pressed forwardly so that the blade 1 cuts a hole around the recess, while the pin 8 is retracted into the shank 4. If the center recess is too shallow or the spring is too weak, the pin 8 may jump out of the recess during the operation, thus losing the centering action.

The applicant's Japanese Patent Early Publication No. H.4-105,811 dated Apr. 7, 1992 shows another hole cutter including a shank 2, a cylindrical blade 6 and a center drill 10, which is fixed to the shank 2 and projects forwardly from the blade 6. First, the drill 10 bores a center bore in a metal plate. If the plate is thick, the center boring may continue after the blade 6 begins cutting, and consequently add a resistance to the cutting resistance of the blade 6, thus lowering the operation efficiency.

It is a general object of the present invention to provide a hole cutter having both a center drill for initially boring a sufficiently deep center bore in a metal plate, and a centering pin for insertion into the bore.

SUMMARY OF THE INVENTION

A hole cutter according to this invention comprises:
a spindle adapted to be rotated and pressed forwardly toward its front end, the spindle having an axial center bore,
a cylindrical blade adapted to be fixed to the front end of the spindle,
a centering pin supported in telescopic relation with the spindle bore, the pin having means for engaging with the spindle to limit the forward movement of the pin relative to the spindle,
a spring supported in the spindle bore and urging the pin forwardly relative to the spindle to normally project a portion of the pin forwardly from the spindle and blade, and
a center drill adapted to be fixed to the front end of the spindle to project forwardly from the blade, the drill having an axial center bore for receiving the projected portion of the pin and a bit at its front end.

BRIEF DESCRIPTION OF THE DRAWINGS

A preferred embodiment of the invention is shown in the accompanying drawings, wherein.

DETAILED DESCRIPTION OF THE INVENTION

Figure 1:
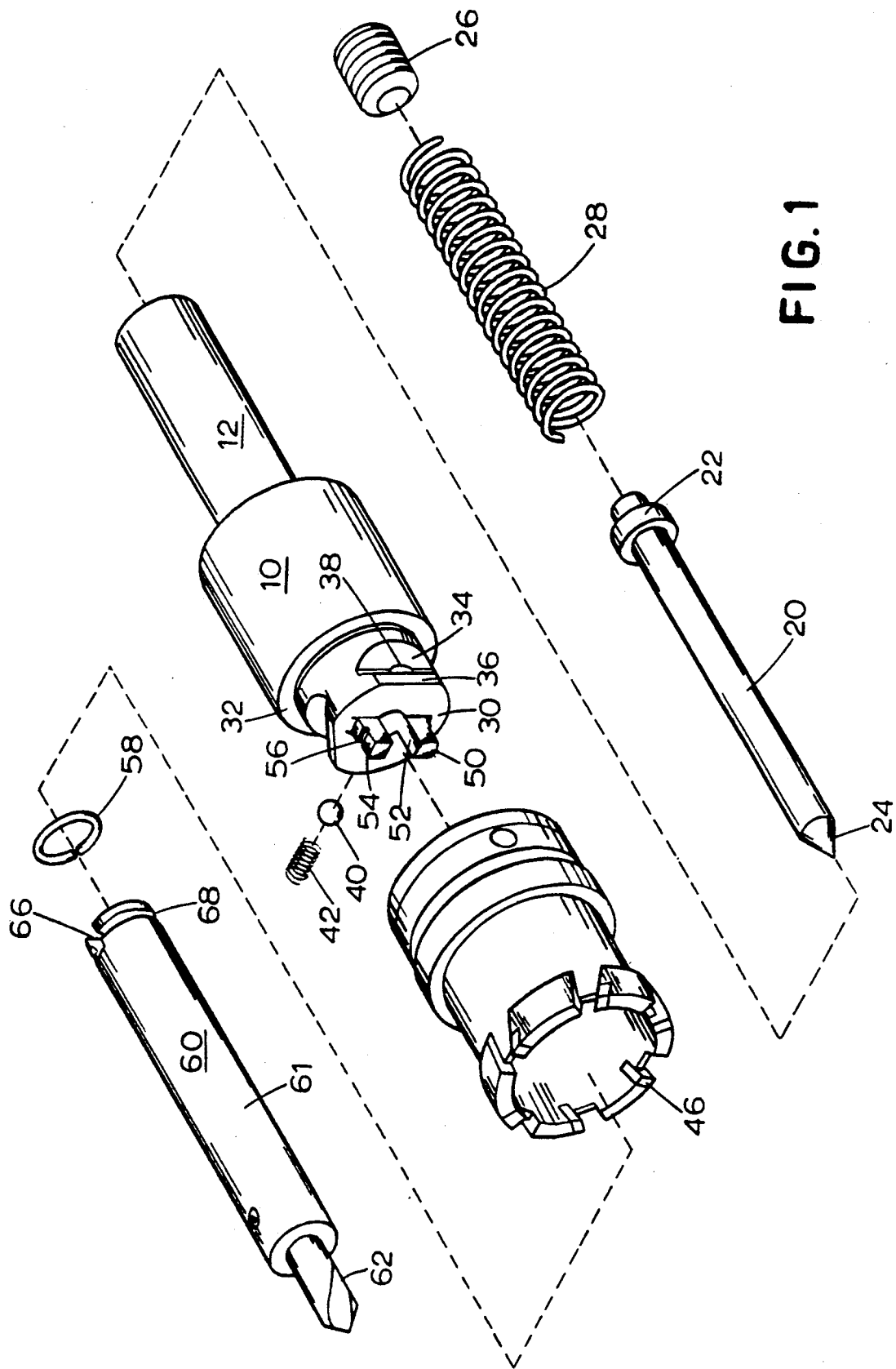
FIG. 1 is an exploded perspective view of a hole cutter according to the invention.
Figure 2:
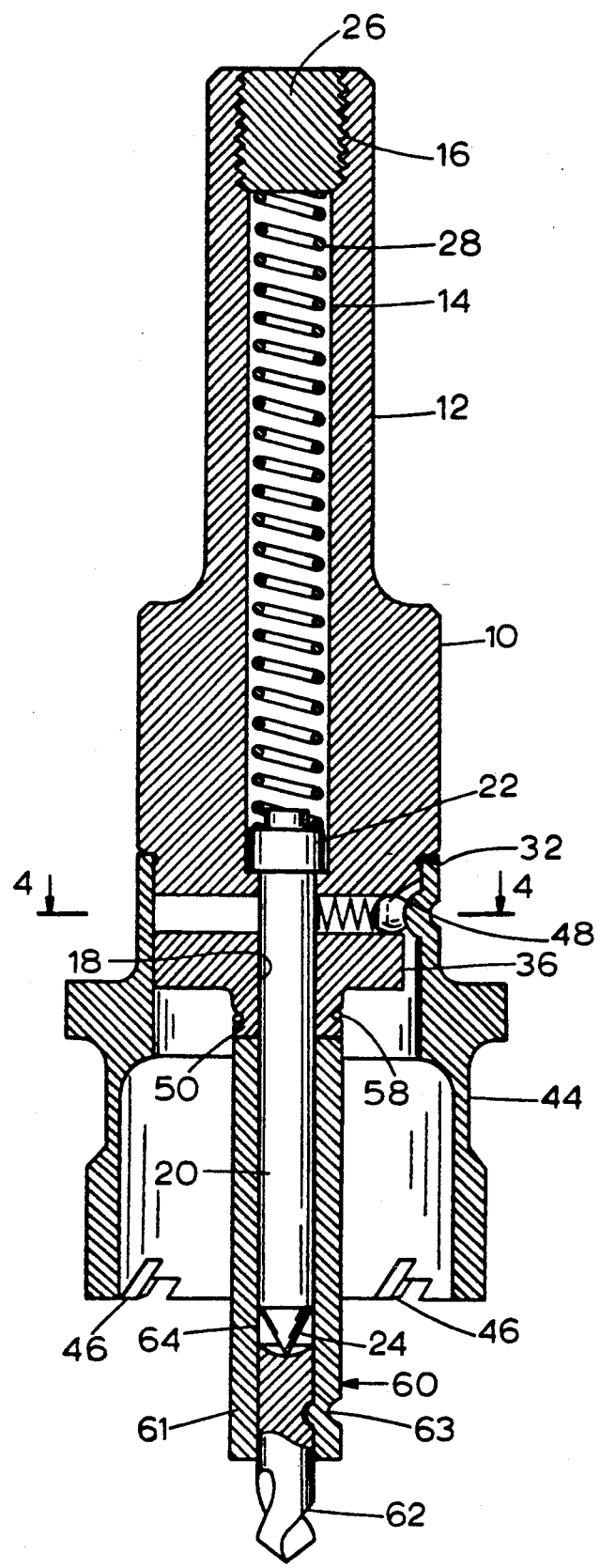
FIG. 2 is a side view in axial section of the cutter.

With reference to the drawings, particularly to FIGS. 1 and 2, the hole cutter includes a spindle 10 having a shank 12 at its rear end, which can be chucked to a drive shaft of a drill press (not shown) to be rotated and pressed forwardly.

The spindle 10 has an axial center bore 14, which ends in an inner thread 16, and another axial center bore 18, which is connected to the bore 14 and is smaller in diameter than it.

A centering pin 20 has a rear flange 22 in the bore 14 and a pointed front end 24, and can slide axially through the bores 14 and 18. The forward movement of the pin 20 is limited by the flange 22 engaging with the front end of larger bore 14. A rear stop screw 26 engages with the thread 16. A spring 28 is compressed between the screw 26 and the pin flange 22 and urges the pin 20 forwardly.

The spindle 10 has a front end portion 30 smaller in diameter than the middle portion (between the shank 12 and the end portion 30), a peripheral step 32 being formed between the middle portion and the portion 30. The front end portion 30 has three notches 34 (FIGS. 3 and 4) at angularly regular intervals in its peripheral surface. Each notch 34 is connected and axially aligned with a plane or flat surface 36 in the periphery at the front end of portion 30 (see FIG. 1).

Figure 4:
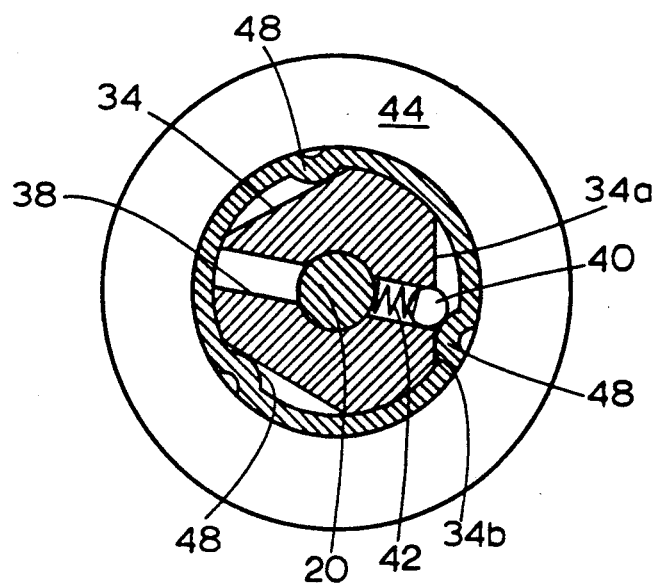
FIG. 4 is a sectional view along line 4—4 of FIG. 2, but with parts angularly moved somewhat.

The front portion 30 also has a radial hole 38 diametrically through it, one end of the hole opening in the bottom of one notch 34 and being narrowed relative to the other end. As best shown in FIG. 4, the narrow end of hole 38 is offset angularly from the center of the notch 34, and divides the bottom of this notch into a long side 34a and a short side 34b.

A ball 40 is placed in the narrowed end of the hole 38 and urged outwardly by a spring 42 compressed between the ball 40 and the pin 20 to normally project a portion of the ball from the narrowed end of the hole and a smaller portion beyond the plane surface 36 (see FIG. 2).

A cylindrical blade 44 (FIG. 1) has a number of teeth 46 at its forward end, and it has three round bumps or inner projections 48 (FIGS. 2 and 4) at angularly regular intervals adjacent its rear end. The projections 48 transmit the torque from the spindle 10 to the blade 44.

By axially aligning one projection 48 with the long side 34a of the notch associated with the hole 38, the blade 44 can be slid axially on the front end spindle portion 30 until it contacts the step 32 (see FIG. 2) and the projections 48 reach the notches 34. Then, by manually rotating the blade 44 clockwise as seen in FIG. 4 relative to the spindle 10, one of the projections 48 snaps over the ball 40 to the short side 34b of the notch (FIG. 4) to normally fix the blade 44 to the spindle 10 both axially in the upward direction and angularly in the counter-clockwise direction.

The front spindle portion 30 includes two legs 50 (FIGS. 1 and 3) which project downwardly from its bottom end, each leg having inner and outer cylindrical surfaces 52 and 54. Each outer surface 54 has a peripheral groove 56 for receiving and engaging with a split ring 58.

A center drill 60 includes a tubular part 61 and a bit 62. The part 61 has a center bore 64 that is slightly larger than the centering pin 20. The axial center bore 64 has the same diameter as the smaller bore 18 of spindle 10, so that a front portion of the pin 20 can axially slide in the bores 18 and 64.

Figure 3:
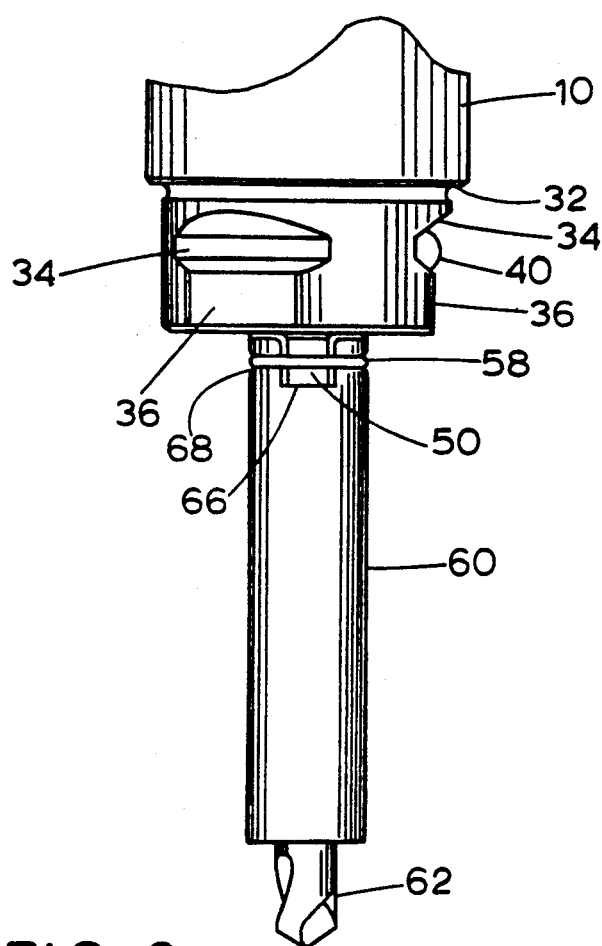
FIG. 3 is a side view of part of the cutter.

The rear end of the drill 60 has two recesses 66 (FIGS. 1 and 3), each being in driving engagement with one spindle leg 50, and two aligned peripheral grooves 68 for engagement with the split ring 58 (see FIG. 3). The legs and the ring normally keep the drill 60 in engagement with the spindle 10.

The bit 62 is secured to the tubular part 61. The bit 62 extends into the lower end of the bore 64 of the part 61 and they are secured together by crimping a portion 63 of the party 61 into a dimple in the bit 62.

In operation, with the blade 44 and the drill 60 engaging with the spindle 10 as shown in FIG. 2, the spindle 10 is rotated clockwise as seen from the rear and pressed forwardly, so that the drill bit 62 bores a center bore at a predetermined point in a thick metal plate. When a predetermined depth of the center bore is reached (before the bottom end of the part 61 engages the metal plate), the operation is stopped and the cutter tool is pulled back from the plate.

Then, the center drill 60 is pulled forwardly against the force of split Ping 58 to disengage the drill 60 from the spindle 10. It will be noted that the centering pin 20 has substantially the same diameter as the bit 62. Thereafter, the thus exposed pointed front end 24 of the centering pin 20 is inserted into the earlier formed center bore, and the spindle 10 is again rotated and pressed so that the blade 44 cuts a hole around the center bore in the plate. During this cutting, the pin 20 is held in the center bore securely without springing out because it is inserted into the bore substantially to the full depth of the previously drilled bore.

What is claimed is:

1. A hole cutter comprising
   a spindle having a rearward end shaped to be engaged and rotated by a drive machine, said spindle further having a front end and an axial center bore,
   a cylindrical blade for attachment to said front end of said spindle,
   a centering pin supported in telescopic relation within said center bore of said spindle, said pin having means for engaging with said spindle to limit the forward movement of said pin relative to said spindle,
   a spring supported in said center bore and urging said pin forwardly relative to said spindle to normally project a portion of said pin forwardly from said spindle and said blade, and
   a center drill, means for removably attaching said center drill to said front end of said spindle, said center drill projecting forwardly from said blade and from said pin, the drill having an axial center bore which receives the projected portion of said pin, said drill further having a bit attached to its front end and extending forwardly of said pin.

2. A hole cutter as set forth in claim 1, wherein said center drill is detachable from said spindle to expose said projected portion of said pin.

* * * * *

UNITED STATES PATENT AND TRADEMARK OFFICE
CERTIFICATE OF CORRECTION

PATENT NO. : 5,316,418
DATED : May 31, 1994
INVENTOR(S) : Masaaki MIYANAGA

It is certified that error appears in the above-identified patent and that said Letters Patent is hereby corrected as shown below:

On the title page, item [21], Appl. No. 749,809, should read "Appl. No. 07/947,809".

Signed and Sealed this

Twentieth Day of September, 1994

Attest:

BRUCE LEHMAN

Attesting Officer       Commissioner of Patents and Trademarks